Nov. 12, 1929.   W. G. WILKES   1,735,069
FEEDER FOR TYPE CASTING MACHINES
Filed April 28, 1928   2 Sheets-Sheet 2
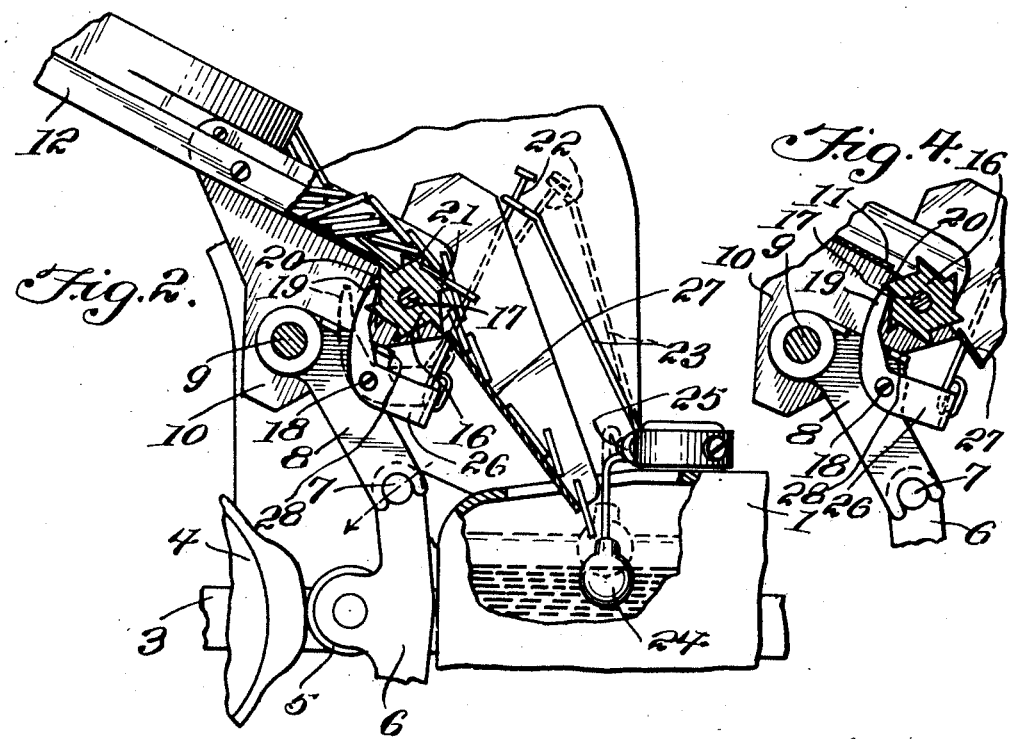
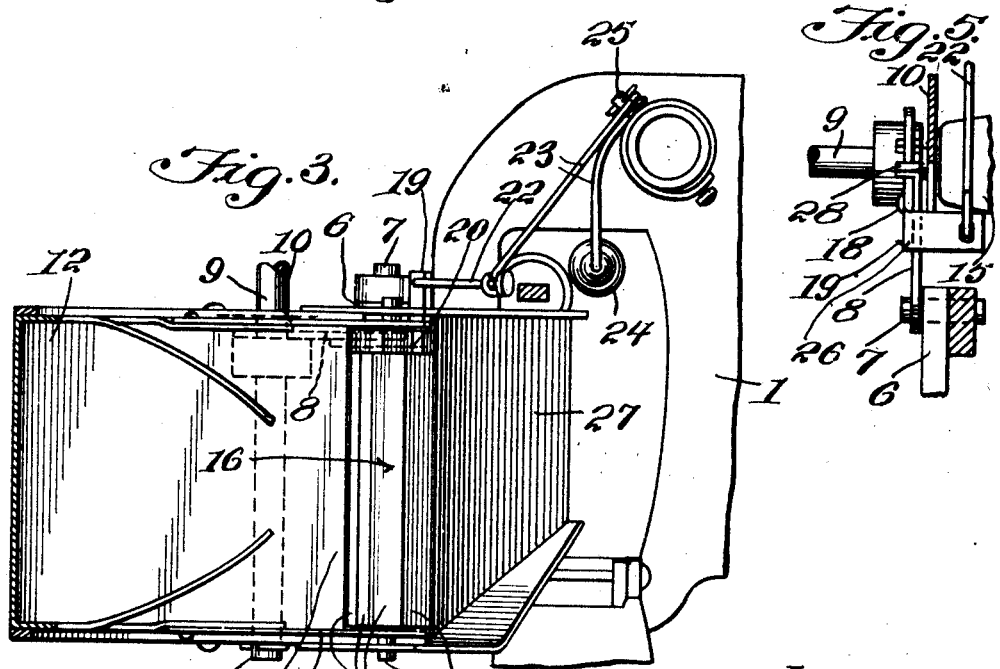
Inventor
Walter G. Wilkes
By Spear, Middleton, Donaldson & Hall
Attorneys Patented Nov. 12, 1929

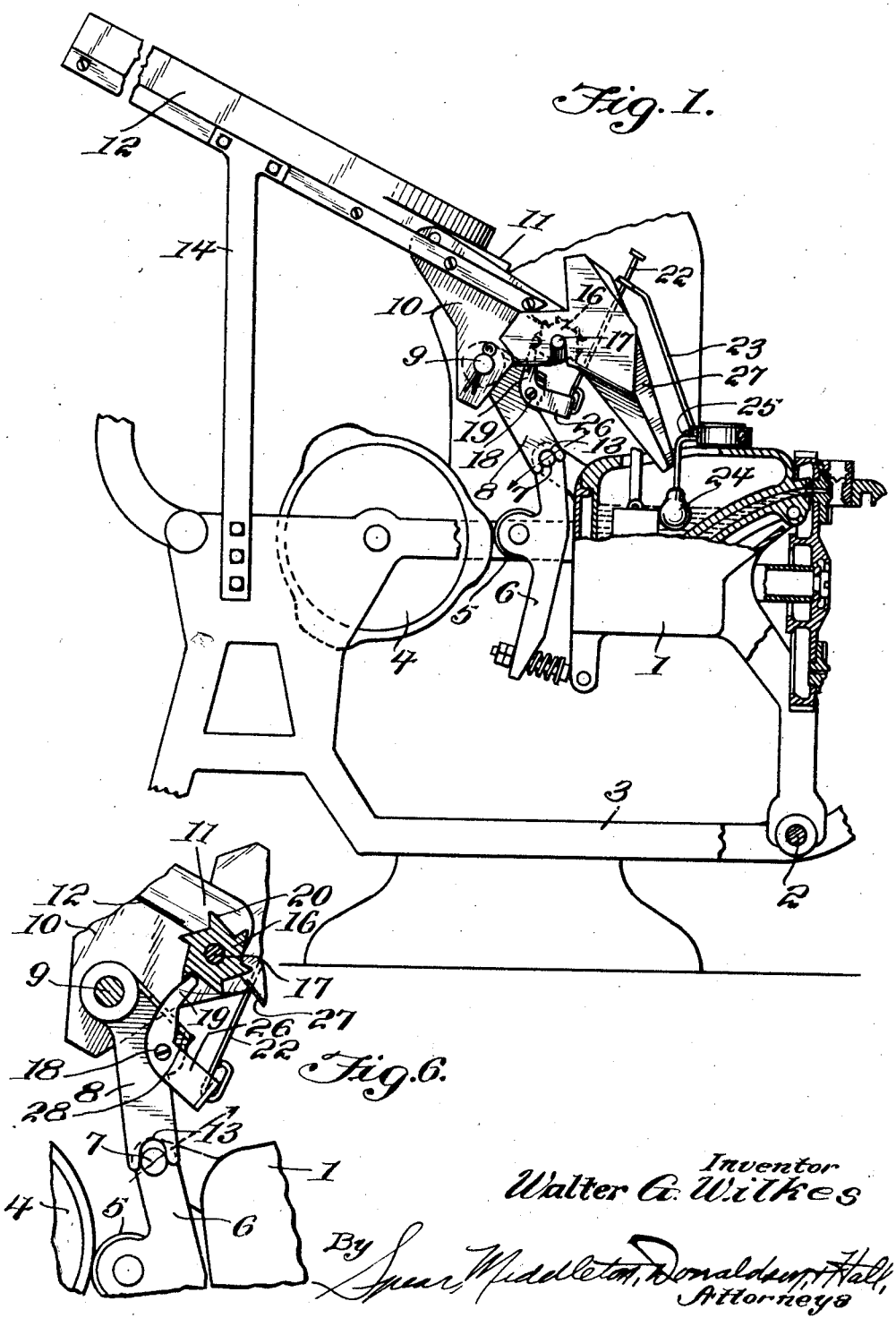

1,735,069

UNITED STATES PATENT OFFICE

WALTER G. WILKES, OF BILOXI, MISSISSIPPI

FEEDER FOR TYPE-CASTING MACHINES

Application filed April 28, 1928. Serial No. 273,589.

My invention relates to improvements in metal feeding devices for linotype or other type making or casting machines.

An object of the invention is the provision of novel and efficient means for feeding slugs or types to the tiltable melting pot for the metal.

Another object is to provide simple and novel means actuated by the reciprocating metal melting pot and controlled by the level of molten metal in the pot to feed slugs, or types, to the pot.

Other objects will appear from the accompanying specification, drawings and claims.

The invention consists in the features, combination, and arrangement of parts hereinafter described and particularly pointed out in the claims.

In the drawings,

Figure 1 is a view in side elevation of my improved linotype feeder mounted on the frame of the linotype machine in association with the tilting linotype pot and operable thereby.

Fig. 2 is a detail view of the link and crank connection of the pawl with the float and pot.

Fig. 3 is a top plan view of my improved feeder.

Fig. 4 is a detail view of Fig. 2 showing the pawl in engagement with its ratchet.

Fig. 5 is a detail view looking from the right in Fig. 2 and showing the pawl and link and connections.

Fig. 6 is a view similar to Fig. 2 with the pot in rearward position and the pawl engaging the ratchet to rotate it when the pot moves forward.

Referring to the drawing, 1 represents the linotype pot pivotally mounted at its lower end as shown at 2 to the frame 3 of the linotype machine in the conventional manner, for tilting movement intermittently imparted thereto by cam wheel 4, through roller 5 and lever 6.

The pin 7 forming the pivot for the upper end of pot actuating lever 6 of the linotype machine in the embodiment of the invention shown, also serves as the actuating pin for a lever 8 of the feeding device. Any suitable pin or lug on the pot 1 may be provided within the scope of the invention, to operate the lever 8.

The lever 8 is pivotally mounted on spindle 9 which also carries bracket 10 at the discharge end 11 of the chute 12, and is provided with a notch 13 in its lower end, adapted to receive the pin 7 and to remain in engagement therewith so that every movement of pot 1 will cause a like movement of the lever 8.

Spindle 9 is a lengthened shaft of linotype machine, which acts as a support for the cover end of chute 12.

The chute 12 is mounted on the linotype machine frame by suitable supports 14 and lengthened linotype machine shaft 9, and at an inclination such that the slugs or other metal material will continually be disposed adjacent the discharge end 11 of the chute in readiness to be fed out of the discharge end and into the pot upon rotation of the paddle wheel or ratchet wheel 16.

The wheel 16 is mounted for rotation in bracket 10 by means of shaft 17 or the like.

Mounted pivotally upon the lever 8 as shown at 18 is a pawl 19 adapted to cooperate with the wheel 16 to impart motion of the lever 8 thereto. Stop means 28 are provided for the pawl on lever 8.

The pawl 19 is adjustable into and out of engagement with the ratchet 20 of the wheel 16 according to the level of the molten metal in the pot 1.

It will be noted that the teeth of ratchet 20 of wheel 16 are oppositely disposed with respect to the paddles 21 of the wheel 16.

To the pawl 19 is connected a link 22 of any suitable material such as wire, which link is connected to a bell crank 23 which may also be of wire or other suitable material, the bell crank being pivotally mounted on the pot 1 at 25 and carrying a float 24 at its free end which rests on the surface of the molten metal in the pot.

The operation of my feeding device is as follows: The lever 8 is moved back and forth with movement of the pot 1 as above described, and so long as metal is needed to keep the pot supplied to a certain desired level determined by the distance from or position of the float 24 with respect to the fulcrum 25 of the bell crank 23, the pawl 19 operates the ratchet 20 of wheel 16, one step for each reciprocation of the pot and a corresponding amount of slugs or other metal material is carried over by the paddles 21 of wheel 16, and precipitated into the melting pot 1. However, when the level of molten metal in the pot rises above the said desired level, the float 24 in raising above that level operates through bell crank 23 and link 22 to pull up on the end 26 of pawl 19 to disengage the pawl from the ratchet and to stop the feed. It will be apparent further that when the level of the molten metal drops below the desired level the end 26 of pawl 19 will be pushed down by its own weight and the weight of link 22 to engage the pawl with the ratchet to start the feed.

Thus through lever 8 operating with every reciprocation of the pot, and its pawl 19 adjustable, according to the level of molten metal in the pot, to operate the feed paddle wheel 16, automatic feeding of slugs is provided such that the metal in the pot is continually maintained substantially uniform in amount.

A trough 27 is mounted on the end of the chute to receive the metal fed by the roller 16 and to guide and discharge it into the pot.

The invention is not limited to the specific embodiment shown and while my feeding device is shown in connection with a linotype form of type casting machine, it will be understood that the feeder lever of my device may be operated by a moving part of other forms of type making or casting machines using molten metal.

I claim:

1. In combination with a type making machine having a melting pot and a reciprocating member, means for feeding metal to the melting pot of the machine, said means comprising a metal feeding chute mounted to discharge into the melting pot, a roller at the discharge end of the chute for controlling the discharge of metal from the chute, a lever continuously in engagement with the reciprocating member of the type making machine to be actuated by every reciprocating movement thereof, and means on said lever adjustable according to the level of molten metal in the pot into and out of position to positively actuate said roller to discharge metal from the chute.

2. In combination with a type making machine having a melting pot and a reciprocating member, means for feeding metal to the melting pot comprising a feeding chute for the metal mounted to discharge into the pot, a roller mounted at the discharge end of the chute for controlling the discharge, a ratchet on the roller, a lever pivotally mounted to the chute and continuously in engagement with the reciprocating member of the type making machine to be actuated by every movement thereof, a pawl pivotally mounted on said lever and means for adjusting said pawl into and out of engagement with said ratchet to actuate the roller to discharge metal from the chute into the pot, or to clear the ratchet according to the level of molten metal in the pot.

3. In combination with a type making machine having a melting pot and a reciprocating member, means for feeding metal to the melting pot comprising a feeding chute for the metal mounted to discharge into the pot, a roller wheel mounted at the discharge end of the chute for effecting the discharge upon rotation thereof, a ratchet on the roller, a lever pivotally mounted on the chute and continuously in engagement with the reciprocating member to be actuated by every movement thereof, a pawl pivotally mounted on the lever and having a free arm and means for adjusting said pawl into and out of engagement with said ratchet to actuate the roller to discharge the metal from the chute into the pot, or to clear the ratchet according to the level of the molten metal in the pot, said pawl adjusting means comprising a link connected to the free arm of said pawl, a bell crank connected to said link and fulcrumed on the pot, and a float on the free end of the bell crank adapted to rest on the surface of the metal in the pot.

4. In combination with a type making or casting machine, having a tiltable, reciprocating melting pot, a pin on the melting pot, means for feeding metal to the melting pot comprising a feeding chute for the metal mounted to discharge into the pot, a roller mounted at the discharge end of the chute for effecting the discharge upon rotation thereof, a ratchet on the roller, a lever pivotally mounted on the chute and continuously in engagement with the pin on the reciprocating pot to be actuated by every movement thereof, a pawl pivotally mounted on the lever and having a free arm, and means for adjusting said pawl into and out of engagement with said ratchet to actuate the roller to discharge the metal, or to clear the ratchet, according to the level of the molten metal, in the pot, said pawl adjusting means comprising a link connected to the free arm of the pawl, a bell crank connected to said link and fulcrumed on the pot, and a float on the free end of the bell crank adapted to rest on the surface of the metal in the pot.

5. Apparatus according to claim 4 in which said roller is provided with paddles or ratchet teeth disposed oppositely to the teeth of the ratchet.

6. In combination in a type making machine having a reciprocating melting pot, a member reciprocating in unison with the melting pot, a positive feed for slugs operated from said reciprocating member, a float and connections operated thereby to render the positive feed effective or ineffective.

7. In combination in a type making machine having a reciprocating melting pot and a chute for feeding slugs, a feed roller, a pawl and ratchet for operating the feed roller, a float in the melting pot for throwing the pawl into and out of operation, and means for actuating said pawl in accordance with reciprocations of the melting pot.

In testimony whereof, I affix my signature.

WALTER G. WILKES.